United States Patent
Miller

(12)
(10) Patent No.: US 6,296,694 B1
(45) Date of Patent: Oct. 2, 2001

(54) TRANSPARENT ANTI-FOG ANTI-SPLASH COATING COMPOSITIONS

(75) Inventor: Richard N. Miller, Alva, OK (US)

(73) Assignee: Roger Machson, Sausalito, CA (US)

( * ) Notice: Subject to any disclaimer, the term of this patent is extended or adjusted under 35 U.S.C. 154(b) by 0 days.

(21) Appl. No.: 09/335,063

(22) Filed: Jun. 17, 1999

Related U.S. Application Data

(60) Provisional application No. 60/090,729, filed on Jun. 25, 1998.

(51) Int. Cl.$^7$ .................................................... C09K 3/18
(52) U.S. Cl. .............................................. 106/13; 523/169
(58) Field of Search ............................... 106/13; 523/169; 510/182

(56) References Cited

U.S. PATENT DOCUMENTS

| | | | |
|---|---|---|---|
| 3,819,522 | * | 6/1974 | Zmoda et al. ................... 510/182 |
| 3,989,633 | * | 11/1976 | Frisque .............................. 510/182 |
| 5,030,280 | * | 7/1991 | Hoefer et al. ....................... 106/13 |
| 5,252,245 | * | 10/1993 | Garabedian, Jr. et al. ......... 510/182 |
| 5,750,482 | * | 5/1998 | Cummings ........................ 510/182 |

FOREIGN PATENT DOCUMENTS 53-101544 * 9/1978 (JP).

* cited by examiner

*Primary Examiner*—C. Melissa Koslow
(74) *Attorney, Agent, or Firm*—Johnson & Stainbrook, LLP; Larry D. Johnson; Craig M. Stainbrook

(57) ABSTRACT

The present invention is directed to an anti-fogging/anti-splash composition that can be used for anti-fog/anti-splash applications. When applied to the surface of a transparent or reflective substrate, the composition dries relatively clear and comprises a solution of a non-toxic, fast drying solvent or alcohol and a surface active agent containing sodium lauryl ether sulfate, and either a block ethylene oxide/polyethylene oxide copolymer, an ethoxylated amine, an ethoxylated acetylenic alcohol, sodium sulfosuccinate, ethoxylated sorbitan ester, random EO/PO polymers on butyl alcohol, or mixtures thereof. When applied to the surface of a substrate, the present invention provides a coating of high transparency which cures rapidly, is sufficiently surface active to be an anti-fog agent when "dry", will persist when "wet" under water spray conditions (such as on a dental mirror) for a period substantial enough to be practicable, and will provide anti-splash benefits throughout the use cycle.

13 Claims, No Drawings

TRANSPARENT ANTI-FOG ANTI-SPLASH COATING COMPOSITIONS

This application claims benefit to U.S. Provisional Application Ser. No. 60/090,729 filed Jun. 25, 1998.

BACKGROUND OF THE INVENTION

1. Field of the Invention

The present invention relates generally to coating compositions, and more particularly to coating compositions that can be used for anti-fog and anti-splash applications.

2. Background of the Prior Art

For many years hydrophilic surfactants have been used as anti-fog coatings and films for windows, mirrors, eye glasses, goggles, face masks, automobile windshields, medical instruments, and numerous other substrates. Fog is caused when moisture condenses on the surface of a relatively cool, nonporous surface exposed to a warmer humid atmosphere (it is also present on porous surfaces, but not easily seen). When applied to a transparent or reflective substrate, the hydrophilic property of an anti-fog surfactant spreads condensed droplets over the surface of the substrate, thus maintaining a high degree of the dry transparency or reflectivity. Superior products dry virtually clear and invisible on the substrate, and their de-fogging property persists for a substantial period, ideally through the use cycle of the device to which they are applied; yet they are highly water soluble and flushed off quickly if wet conditions become extreme.

Anti-splash products are typically designed to keep automobile windshields clear during heavy rain or splashes. This is accomplished by applying a water-repellant (hydrophobic) agent to the windshield surface: the coating repels water and makes it rapidly run off the windshield surface, minimizing the degree to which visibility is obscured and thus reducing danger.

Several properties of anti-splash products limit their application in anti-fog circumstances. Most notably, surfaces coated with anti-splash agents provide the greatest benefits when the following conditions obtain: (1) the surface is heavily wetted, because tiny water droplets will not run off of the substrate surface and will obscure rather than clarify the view; (2) when the only concern is the visibility of relatively large objects on the wetted side of the surface; and (3) when there is a large distance between the objects perceived on the "wet" side of the surface and the perceiver, such that refraction of light rays by irregularities in water droplet thickness is minor relative to the information content which passes through.

Numerous compositions have been proposed for anti-fog or anti-splash applications. U.S. Pat. No. 5,853,896 discloses a water-repellant composition consisting of a mixture of organosilane having the formula R.sup.1.sub.a SiX.sub.(4a). Anti-fog compositions include, among others, U.S. Pat. No. 5,804,612, which discloses a composition comprising a hydroxyl group containing polymer, an aluminum containing crosslinker, and a surface active agent containing hydroxyl and/or siloxane groups. U.S. Pat. No. 5,244,935 discloses a UV curable amide polymer. U.S. Pat. No. 5,075,133 discloses a crosslinked poly(vinyl alcohol) coating. U.S. Pat. No. 4,478,909 discloses a poly(vinyl alcohol)-silica system. U.S. Pat. No. 4,127,682 discloses a crosslinked poly(vinyl alcohol) coating. U.S. Pat. No. 4,467,073 discloses a coating based on poly(vinyl pyrroloidone). U.S. Pat. No. 3,933,407 discloses an acrylic siolxane system. U.S. Pat. No. 3,865,619 discloses a crosslinked carboxylic acid-acrylic acid ester coating.

In certain applications, such as, for example, dental mirrors, where both anti-fog and anti-splash properties are required, where accurate reflection of a patient's dental details is of paramount importance, and where non-toxicity is imperative, none of the foregoing compositions is completely satisfactory. None represent a total solution to the anti-fog/anti-splash application. Some require lengthy curing. Some are toxic. Many will immediately dissolve and wash off from a dental mirror in the water generated by high speed drills in current use. And none provide adequate visibility for viewing details in the operative field: the proximity of a dental mirror to the tooth diffuses the reflection and obscures tooth details necessary for precise dental work.

SUMMARY OF THE INVENTION

The present invention overcomes the disadvantages of the above-referenced prior art. The present invention provides a coating composition of high transparency which dries rapidly, is sufficiently surface active to be an anti-fog agent when "dry", will persist when "wet" under water spray conditions (such as on a dental mirror) for a period substantial enough to be practicable, and will provide anti-splash benefits throughout the use cycle.

The present invention relates to anti-fog and anti-splash coating compositions for dental mirrors. The anti-fog/anti-splash composition of the present invention comprises a solution of water and common alcohols (ethanol, or 2-propanol, or a mixture thereof, or in the non-medical/dental setting, the foregoing alcohols or methyl alcohol, propyl alcohol, or a mixture thereof), into which is dissolved one or more surface active agents containing one or more of sodium lauryl ether sulfate (SLES), neutralized ether sulfate, a block ethylene oxide/polyethylene oxide copolymer, an ethoxylated amine, an ethoxylated acetylenic alcohol, sodium sulfosuccinate, ethoxylated sorbitan ester, and/or random EO/PO polymers on butyl alcohol.

DETAILED DESCRIPTION OF A PREFERRED EMBODIMENT

In the present invention there is provided an advantageous anti-fog/anti-splash composition, which comprises a solution of water and common alcohols (either ethanol, 2-propanolmethanol, or propyl alcohol), into which is dissolved one or more surface active agents containing one or more of sodium lauryl ether sulfate (SLES), neutralized ether sulfate, a block ethylene oxide/polyethylene oxide copolymer, an ethoxylated amine, an ethoxylated acetylenic alcohol, sodium sulfosuccinate, ethoxylated sorbitan ester, and/or random EO/PO polymers on butyl alcohol.

The present invention preferably employs 50–80% 2-propanol as a solvent and delivery medium. Alternative solvents in the medical/dental setting include 50–80% ethanol, or 50–80% of any mixture of 2-propanol and ethanol. In the non-medical setting, solvents may also include methanol, propyl alcohol, or mixtures thereof.

The present invention preferably employs SLES as the surfactant in a concentration of about 0.1 to about 10 wt % based on the total weight of the composition, depending upon the method of application and delivery vehicle. However, numerous other surface active agents may be employed, the most practicable of which include ethoxylated acetylenic alcohols, such as Surfynol CT-111; sodium sulfosuccinate; high EO (ethylene oxide) octyl phenols, such as Iconol OP-10 and Triton CF-87; high EO nonyl phenols, such as Igepal CO-730 (NP-15); high EO linear and secondary alcohols, such at Tergitol 15-S-12 (secondary), Tergitol TMN 10 (90%) (linear), Neodol 1-9(linear), Neodol 25-12 (linear), and Mazawet 36 (Decyl random EO/PO; ethoxylated amines of any EO length, such as Chemeen T-10 (tallow, 10EO), Chemeen T-15, Chemeen C-15 (Coco. 15 EO), Trymeen 6640A, Tomah E-18-15 (18C, 15EO), Tomah E-18 10, and Tomah E-S-15 (Soya); ethoxylated sorbitan ester, e.g., POE 20 Sorbitan Monoleate (BASF T-Maz 80); random EO/PO polymer on butyl alcohol, such as Tergitol XJ, Tergitol XD, Tergitol XH, and Tergitol XH; other water soluble block EO/PO copolymers, such as Pluronic L61LF, Pluronic L101, Pluronic L121, and Plurafac LF131, and Norfox LF-30 and LF-21. More preferably, the surface active agent is present in the composition in an amount of about 3 to 5 wt % based on the total weight of solids in the coating composition.

The compositions of the present invention are prepared by dissolving any one of the above-identified surface active agents, or a mixture thereof, in a liquid delivery vehicle (solvent), preferably water and/or ethanol, 2-propanol, or (in non-medical/dental applications) either methanol or propyl alcohol, or mixtures thereof.

The coatings of the present invention are typically used to provide anti-fog/anti-splash properties to a substrate surface, particularly when the substrate surface comprises transparent or reflective material, such as glass or mirrors. All glass materials are suitable for use as a substrate surface.

The coat thickness (coat weight) of the anti-fog/anti-splash coating is generally unrestricted and depends upon both the method of coating and the application. On dental mirrors, if spray application is employed, the coat weight will range according to operator technique, but effective coat weights were found at approximately 0.0001 g/cm$^2$ (experimentally derived from 0.05 ml liquid spray per squirt, 2–3 squirts per surface area of about 4 cm$^2$, and approximately 50% effective coverage). The method of applying the composition in the dental setting is preferably either spray or immersion coating.

A number of methods, all well known in the art, may be employed for treating (coating) the surface of the substrate with the composition of the present invention, including, but not limited to, spray coating, roller coating, wire-bar coating, dip or immersion coating, extrusion coating, air knife coating, slide coating, blade coating, flow coating, application via cloth or paper impregnated with the composition, or application with gel stick (crayon) impregnated with the composition.

It is contemplated that in the medical or dental clinical setting, the surface to be treated will be sterilized before application of the composition. Thus, treatment of the substrate in this setting is completed after application of the composition by one of the above-indicated methods, and thereafter removal of excess composition either by ambient air evaporation or heating.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed is:

1. An anti-fog/anti-splash composition comprising:
   a solution of alcohol and water;
   a surface active agent comprising sodium lauryl ether sulfate; and
   an EO/PO block copolymer.

2. The anti-fog/anti-splash composition of claim 1, wherein said solution of alcohol and water comprises 50–80% alcohol selected from the group consisting of 2-propanol and ethanol.

3. The anti-fog/anti-splash composition of claim 1 wherein said solution of alcohol and water comprises 50–80% alcohol selected from the group consisting of methanol and propyl alcohol.

4. The anti-fog/anti-splash composition of claim 1 wherein said surface active agent is present in said composition in an amount of 0.1 to 10 wt %, inclusive, based on the total weight of said composition.

5. The anti-fog/anti-splash composition of claim 1 wherein said surface active agent is present in said composition in an amount of 3 to 5 wt %, inclusive, based on the total weight of said composition.

6. An anti-fog/anti-splash composition comprising:
   a solution of alcohol and water;
   a surface active agent comprising sodium lauryl ether sulfate, wherein said surface active agent is present in said composition in an amount of 3 to 5 wt %, inclusive, based on the total weight of said composition.

7. A method of treating a substrate to render it substantially fog-resistant and splash-resistant, which comprises the steps of:
   preparing an anti-fog/anti-splash composition which contains the following ingredients:
      a solution of alcohol and water;
      a surface active agent comprising sodium lauryl ether sulfate, wherein said surface active agent includes an EO/PO block copolymer;
   applying a coating of said anti-fog composition to the surface of a transparent or reflective substrate; and
   removing any excess of the anti-fog/anti-splash composition.

8. The method of claim 7 wherein said solution of alcohol and water comprises 50–80% alcohol selected from the group consisting of 2-propanol and ethanol.

9. The method of claim 7 wherein said solution of alcohol and water comprises 50–80% alcohol selected from the group consisting of methanol, propyl alcohol, ethyl alcohol, or methyl tert butyl ether.

10. The method of claim 7 wherein said surface active agent is present in said composition in an amount from 0.1 to 10 wt %, inclusive, based on the total weight of said composition.

11. The method of claim 7 wherein said surface active agent is present in said composition in an amount of 3 to 5 wt %, inclusive, based on the total weight of said composition.

12. The method of claim 7 wherein said step of removing any excess of the anti-fog/anti-splash composition involves removing the excess with air evaporation.

13. The method of claim 7 wherein said step of removing any excess of the anti-fog/anti-splash composition involves removing the excess by heating.

* * * * *